March 24, 1964      W. M. BURKS, JR., ET AL      3,126,419
CHLORINATION OF METHANE
Filed Sept. 26, 1960                3 Sheets-Sheet 1

FLOW DIAGRAM OF MULTIPLE SERIES REACTOR SYSTEM

PARTIAL METHANE CHLORINATION
MOL RATIO OF PRODUCTS VS. MOL RATIO OF REACTANTS
AT 475°C.

INVENTORS:
WILLIAM M. BURKS, JR.
ROBERT P. OBRECHT
BY Eckhoff & Slick
ATTORNEYS

PARTIAL METHANE CHLORINATION
MOL FRACTION PRODUCT $CH_xCl_y$ VS. MOL RATIO OF REACTANTS
AT 475°C.

PARTIAL METHANE CHLORINATION
MOLS RECYCLE VS. MOL RATIO REACTANTS
AT 475°C.

INVENTORS:
WILLIAM M. BURKS, JR.
ROBERT P. OBRECHT
BY
ATTORNEYS

March 24, 1964 W. M. BURKS, JR., ETAL 3,126,419
CHLORINATION OF METHANE
Filed Sept. 26, 1960 3 Sheets-Sheet 3
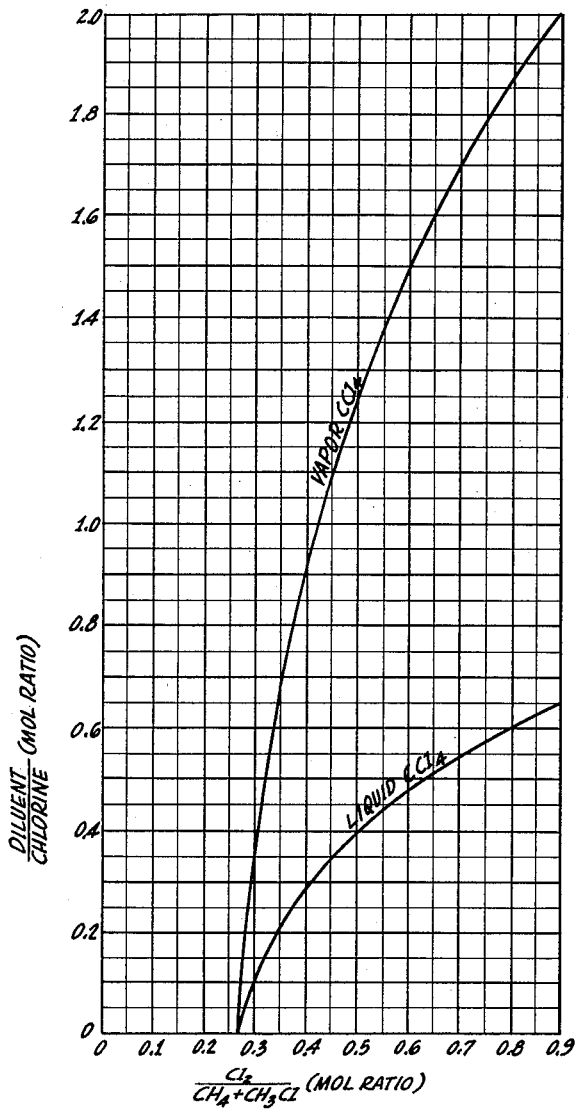
DILUENT CONSUMPTION PER MOL OF TOTAL CHLORINE REACTED VS. CHLORINE RATIO FOR A SINGLE REACTOR SYSTEM AT 475°C.
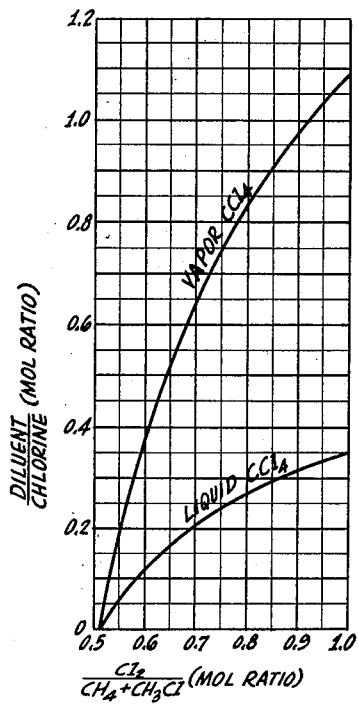
DILUENT CONSUMPTION VS. CHLORINE RATIO FOR TWO SERIES REACTOR SYSTEM AT 475°C. WITH INTERMEDIATE CONDENSATION AT -25°C.
INVENTORS:
WILLIAM M. BURKS, JR
ROBERT P. OBRECHT
BY
Eckhoff & Slick
ATTORNEYS

# United States Patent Office 3,126,419
Patented Mar. 24, 1964

3,126,419
CHLORINATION OF METHANE
William M. Burks, Jr., Louisville, Ky., and Robert P. Obrecht, Orinda, Calif., assignors to Stauffer Chemical Company, a corporation of Delaware
Filed Sept. 26, 1960, Ser. No. 58,367
6 Claims. (Cl. 260—662)

This invention relates in general to a process for the partial chlorination of methane and in particular to a process for maximum production of methylene chloride and/or to chloroform via the chlorination of methane. It is well known that the ratio of chlorine to methane in the feed to the reaction system is a significant factor in determining whether relatively low or relatively high molecular weight components will be obtained where methane is chlorinated. The equilibrium concentrations of the low molecular components in the product stream increase as the chlorine to methane ratio is reduced and decrease as the chlorine to methane ratio is increased. However, since the percentage of conversion of methane to partially chlorinated hydrocarbons decreases as the chlorine to methane ratio is decreased, a reduction in the ratio so as to maximize the low molecular weight components in the product stream results in an increase of the amount of methane which must be recovered from the product stream and recycled. As the equipment required in the processing and handling of unconverted methane represents a significant proportion of the capital investment of an industrial installation designed to produce chlorinated hydrocarbons by the partial chlorination of methane, it is desirable to obtain the desired low molecular weight chlorinated hydrocarbons with a minimum of unconverted methane in the product stream.

It is also known that a diluent for cooling purposes must be used in processes for the partial chlorination of methane whenever the chlorine to methane ratio exceeds approximately 0.20 to 0.30 in the feed to the reaction zone, thus to enable a substantial yield of the heavier reaction components, such as methylene chloride, chloroform, and carbon tetrachloride while not exceeding a desirable maximum reaction temperature. Where the chlorine ratio is increased above 0.20 to 0.30 in the feed, the increasingly exothermic reaction causes greater quantities of heat to be produced which must be controlled by means of the diluent. Obviously, larger diluent requirements affect costs as the diluent must be removed from the product stream and recycled.

It is therefore an object of this invention to provide a process for the partial chlorination of methane which may increase the yield of methyl chloride, methylene chloride, and chloroform while enabling the chlorination of a relatively high proportion of the methane feed, whereby to maintain desirable temperature of the reaction zone and good stability of the reaction zone with minimum methane recycle requirements.

It is a further object of this invention to provide a process for the chlorination of methane which results in the preparation of methyl chloride, methylene chloride, chloroform, and carbon tetrachloride but which may enable the minimizing of the higher molecular weight products, if desired.

A further object of this invention is to provide a process for the partial chlorination of methane, which process may be so performed as to result in relatively high proportions of heavier components, such as chloroform, while minimizing diluent needs.

Another object of this invention is to provide a process for the partial chlorination of methane, which process makes possible an increase in the yields of partially chlorinated hydrocarbons as compared with the conventional processes available heretofore with equivalent recycle handling capacities.

Yet another object of this invention is to provide a process for the chlorination of methane, which process offers substantial flexibility in product distribution.

Generally, this invention relates to an improved process for the partial chlorination of methane which involves passing methane and chlorine together with a liquid, vapor, or gaseous diluent, or, in the alternative, no diluent at all, into a reaction zone wherein the gaseous stream is heated to between 350° C. and 550° C. for a period of between 3 and 30 seconds so as to form HCl, $CCl_4$, partially chlorinated hydrocarbons and unreacted methane, quenching with a liquid media, preferably carbon tetrachloride, and/or passing the stream through a condensation zone operating at a temperature which, in all instances, is no greater than 50° C. to remove, by condensation, certain of the heavier components, such as carbon tetrachloride, chloroform, and possibly methylene chloride, thereafter passing the remaining gaseous materials together with added chlorine and diluent, if desired, into an additional reaction zone maintained at the temperature above noted for a period of between 3 and 30 seconds, so as to form additional HCl, $CCl_4$ and partially chlorinated hydrocarbons along with unreacted methane, thereafter cooling the exiting stream to a temperature of no greater than 0° C. by means of quench and/or condensation, so as to remove carbon tetrachloride, chloroform, methylene chloride, and perhaps methyl chloride, treating the remaining gaseous stream to remove HCl therefrom, drying the remaining gaseous material, and recycling any remaining gaseous material (primarily unreacted methane and whatever methyl chloride is present) to the first reaction zone. The recycled material is reintroduced, with proper mixing, together with make-up methane, diluent and additional chlorine, the quantity of diluent and chlorine being dependent upon the quantity of recycled material and make-up methane introduced.

Figure 1:
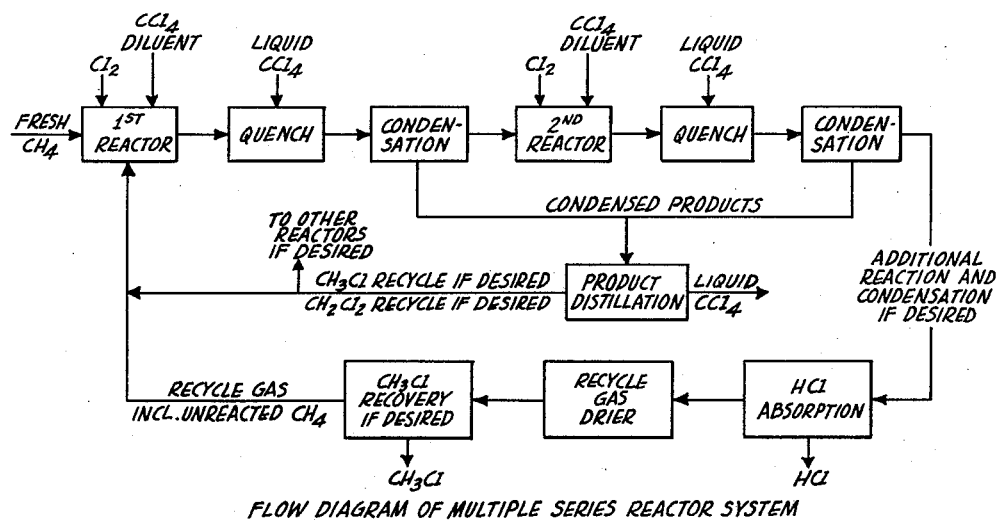
FIGURE 1 is a flow sheet which assists in the understanding of the sequence of steps constituting this process.
Figure 2:
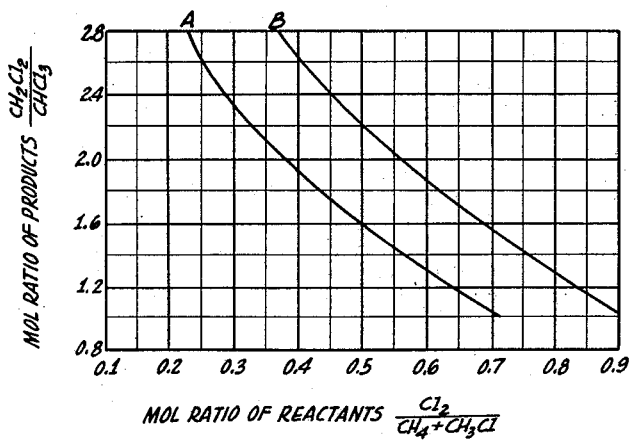
FIGURES 2–4 show the effect of varying the mol ratio of reactants upon certain other variables, curve A in each case representing results obtained using a single reactor and curve B representing results obtained using a two series reactor system with condensation between the first and second reactors. Condensation systems were maintained at −25° C. in each instance.
Figure 3:
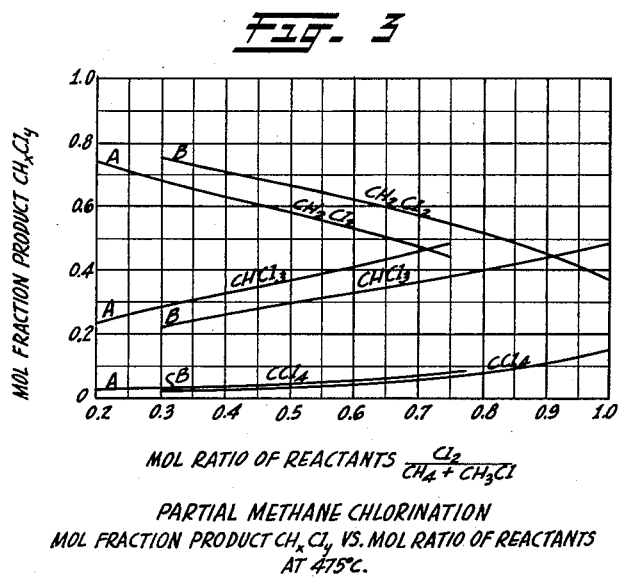
Figure 4:
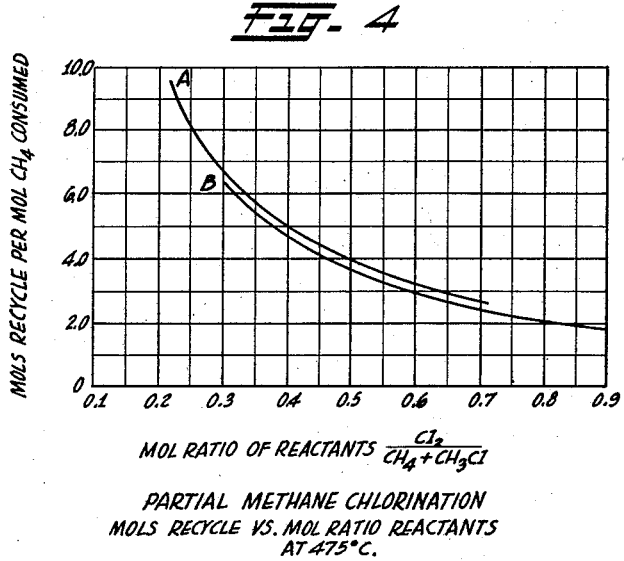

FIGURES 5 and 6 indicate the diluent requirements, at given chlorine ratios, as defined hereinafter, required for continuous operation at 475° C., FIGURE 5 relating to a single reactor system and FIGURE 6 contrasting such diluent requirements for the multiple series reactor system employing two reactors with intermediate condensation. Condensation systems were maintained at −25° C. in each instance.

The multiple series reactor concept significantly reduces the quantity of unconverted methane that must be handled to manufacture a specified quantity of chlorinated hydrocarbons, the percentage reduction being most significant when it is desired to achieve a product distribution favoring the low molecular weight components. The examples in Table I illustrate the comparative requirements for a conventional single reactor as opposed to the multiple series reactors using two reactors separated by a low-temperature intermediate condensation system. In both instances, methyl chloride was maintained in captive equilibrium by means of suitable recycling facilities to exemplify differences between the two systems with respect to methylene chloride and chloroform as major components.

In the tests reported herein, reference is made to various "chlorine ratios." The chlorine ratio may be defined as the ratio of gram mols chlorine fed at any time to the entire system, both in the first and second reactor, to the gram mols of total methane (including feed and recycle of unconverted methane) plus recycle methyl chloride, if any, fed to the first reactor. Where no methyl chloride is recycled, this is omitted from the calculation of the chlorine ratio and the chlorine ratio becomes the ratio of chlorine to make-up methane plus recycle methane. There is also reference to the "recycle ratio" which is defined as the gram mole ratio of recycle methane and methyl chloride to methane consumed. Where no methyl chloride is recycled, this is omitted from the calculation of recycle ratio and the recycle ratio becomes the ratio of recycle methane to methane consumed.

The term "substantially carbon tetrachloride" is used hereinafter and means the carbon tetrachloride fraction which can be most economically distilled by fractionation from a mixture of carbon tetrachloride, chloroform, and methylene chloride. This could be 90–98% by weight, the balance being primarily chloroform.

*Table I*

|  | Single Reactor | | | Two Series Reactors | | |
|---|---|---|---|---|---|---|
|  | Example No. | | | Example No. | | |
|  | 1 | 2 | 3 | 4 | 5 | 6 |
| Chlorine ratio [a] | 0.212 | 0.382 | 0.710 | 0.340 | 0.565 | 0.905 |
| Reaction temp. (°C.) | 475 | 475 | 475 | 475 | 475 | 475 |
| Reaction pressure (p.s.i.g.) | 15 | 15 | 15 | 15 | 15 | 15 |
| Reaction products cooled to (°C.) | −25 | −25 | −25 | −25 | −25 | −25 |
| Liquid diluent in mols/mol $Cl_2$ | [b] | 0.255 | 0.550 | [b] | 0.080 | 0.310 |
| $CH_2Cl_2$ produced (gm.-mol) | 3.0 | 2.0 | 1.0 | 3.0 | 2.0 | 1.0 |
| $CHCl_3$ produced (gm.-mol) | 1.0 | 1.0 | 1.0 | 1.0 | 1.0 | 1.0 |
| $CCl_4$ produced (gm.-mol) | 0.092 | 0.125 | 0.162 | 0.1025 | 0.148 | 0.247 |
| Recycle ratio [c] | 9.77 | 5.28 | 2.68 | 5.74 | 3.27 | 1.95 |
| Conversion of $CH_4$ (percent) | 9.3 | 15.9 | 27.2 | 14.8 | 22.3 | 33.8 |

[a] Gm.-mol ratio of chlorine to methane plus recycle methane and methyl chloride.
[b] No diluent; feed preheated.
[c] Gm.-mol ratio of recycle methane and methyl chloride to methane consumption.

Examples 1 and 4 illustrate the comparative conditions necessary for achieving a product distribution consisting of three gm.-mols of methylene chloride and one gm.-mol of chloroform. With single reactor operation, the chlorine ratio was maintained at 0.212 with low methane conversion and a relatively high recycle ratio requirement of 9.77. The multiple series reactors permit a higher chlorine ratio of 0.340 with a substantial increase in methane conversion and a 41% reduction in recycle ratio to 5.75. The percentage reduction in recycle handling capacity becomes less significant as conditions are altered to achieve a product distribution with a higher percentage of the heavier components; however, a substantial reduction is still realized over the single reactor system at a one to one product ratio as illustrated by Examples 3 and 6. In each of the runs made with the single reactor, the residence time of the gaseous stream within the reactor was about 15 seconds. Where the series reactor set-up was used, the residence time in the first reactor was 5 seconds and in the second reactor 15 seconds. The gas stream was cooled to −25° C. following each reactor.

In each of runs 2, 3, 5 and 6, the diluent used was liquid substantially carbon tetrachloride at about 50° C. Additional runs were made wherein vaporous substantially carbon tetrachloride diluent was introduced with the feed, the combined stream being at a temperature of approximately 100° C. Resulting product distributions were virtually identical to those set forth above. The higher feed temperature for the vapor diluent was necessary to prevent condensation of the diluent prior to entering the reaction system. In each run, temperature equilibrium was first attained without diluent (only chlorine, methane, recycled methane, and methyl chloride were supplied) corresponding to the minimum chlorine ratio for the system at the specified reaction zone temperature, here, 475° C. In the runs using the single reactor, chlorine ratio was then increased by the addition of chlorine and diluent at a ratio of 2.5 mols of vapor substantially carbon tetrachloride diluent or 0.80 mol of liquid substantially carbon tetrachloride diluent per mol of additional chlorine. As the chlorine ratio was increased, methane conversion increased and it was necessary to add fresh methane to attain the equivalent recycle methane and methyl chloride. In the case of the multiple series reactor system, the diluent requirement for the first reactor in the series is equivalent to that for a single reactor. Diluent requirements for succeeding reactors, however, depend upon chlorine usage in preceding reactors, and the temperature of the condensation system preceding each reactor. All of the examples in the table (and in Table II infra) were based upon correlations relating product distribution to chlorine ratio under the conditions postulated in the table (reaction products cooled to −25° C.) and with chlorine being distributed between the two reactors so as to maintain similar chloride ratios for each reactor.

It will be understood that chlorine ratios exceeding those corresponding to the temperature equilibrium existing between chlorine, methane, and recycle methane, together with recycled methyl chloride (if any), were obtained through the use of substantially carbon tetrachloride diluent in such quantities that the total heat capacity of the diluent was equivalent to the heat evolved by the incremental addition of chlorine. In the case of the multiple series reactor system, an increase in chloride and diluent to any one reactor will alter the diluent requirements of succeeding reactors due to the cooling effect of the hydrogen chloride generated which is not removed by the intermediate condensation system.

The reaction in each reaction chamber was substantially complete with respect to chlorine and the gases passing from each reactor contained no free chlorine. These were the conditions during the experimental runs herein documented.

Table II was prepared by adjusting the single reactor data in Table I so that the quantity of recycle methane and methyl chloride at a given product ratio corresponds to the same recycle at the same product ratio for the multiple series reactor system employing two reactors. Examples 1 and 4 illustrate the differences between the two systems for a product ratio favorable to methylene chloride. The multiple series reactor system in this instance provides a 70% increase in the amount of methylene chloride and chloroform that can be produced with the same recycle handling capacity.

*Table II*

|  | Single Reactor | | | Two Series Reactors | | |
|---|---|---|---|---|---|---|
|  | Example No. | | | Example No. | | |
|  | 1 | 2 | 3 | 4 | 5 | 6 |
| Product ratio [a] | 3.0 | 2.0 | 1.0 | 3.0 | 2.0 | 1.0 |
| Chlorine ratio [b] | 0.212 | 0.382 | 0.710 | 0.340 | 0.565 | 0.905 |
| Recycle (gm.-mol) | 23.6 | 10.3 | 4.4 | 23.6 | 10.3 | 4.4 |
| $CH_2Cl_2$ produced (gm.-mol) | 1.764 | 1.246 | 0.757 | 3.0 | 2.0 | 1.0 |
| $CHCl_3$ produced (gm.-mol) | 0.588 | 0.623 | 0.757 | 1.0 | 1.0 | 1.0 |
| $CCl_4$ produced (gm.-mol) | 0.054 | 0.078 | 0.123 | 0.1025 | 0.1025 | 0.247 |

[a] Gm.-mol ratio methylene chloride to chloroform.
[b] Gm.-mol ratio of chlorine to methane plus recycle methane and methyl chloride.

In all of the runs described above, the stream of unreacted materials and products was removed from the first reactor and passed into a quench tank consisting substantially of liquid CCl₄ at a temperature of between 100° and 125° C. The gas stream was sparged into the liquid body with the result that any carbon that had been formed was removed. Quench tanks and the use of quench systems in thermal aliphatic or olefinic hydrocarbon chlorination systems are well known. Following the quench tank, a condensation system of conventional construction was used, operating at a temperature of —25° C. The gaseous material exiting from the condensation system contained substantially unreacted methane, methyl chloride, and HCl. This stream was passed to the second reactor in runs 4, 5 and 6 where further chlorination was accomplished, and following this the process of quenching and condensing to —25° C. was repeated. Then in all instances the stream was passed into an absorption tower containing dilute aqueous HCl which served to remove the HCl from the gas stream, thus leaving a mixture of predominately unreacted methane and methyl chloride. The methane and methyl chloride were then dried by being passed upwardly through a countercurrent scrubbing tower using sulfuric acid as the drying agent, and the gas recycled. As is well known in the art, substantial quantities of HCl are produced since HCl is produced on a mol for mol basis, based upon the Cl₂ reacted. It will be noted that the chlorine ratio given in the tables does not specify the distribution of chlorine to each of the two reactors. In the runs described above, about half of the total chlorine was introduced into each of the reactors in the manner shown in FIGURE 1.

Table I above points up one of the major advantages of this invention which is secured when operating at high chlorine ratios. For example, where a product distribution of 1.0 (methylene chloride to chloroform) is desired using the two series reactor system, as indicated in Example 6, liquid diluent consumption amounted to 0.31 mol per mol of chlorine reacted, whereas use of vapor diluent would require approximately 0.97 mol per mol of chlorine, or roughly three times as much (see FIGURE 6). Where the same product distribution using the single reactor system is desired (Example 3) liquid diluent consumption is approximately 0.55 mol per mol of chlorine and where vapor diluent is selected, 1.72 mols diluent per mol of chlorine is required (FIGURE 5). Thus, the single reactor system consumes approximately twice as much equivalent diluent per mol of chlorine reacted as the two series reactor system in achieving the product distribution set forth in Examples 3 and 6 of the table.

The low temperature condensation system between reactors is designed to separate the chlorinated hydrocarbons produced from hydrogen chloride and unconverted methane. Such a system can consist of any suitable method for effecting condensation such as combinations of equipment cooled by air or water, and refrigeration. Refrigerated condensation can be accomplished through the direct expansion of any suitable refrigerant such as ammonia, methyl chloride, freon, or propane, or by a second fluid such as brine acting between the process condensers and a central refrigeration system. It is desirable that the gaseous stream exiting from each reactor be sparged through a liquid body, so as to provide means for removing trace quantities of carbon and to provide the initial cooling means. Otherwise, a condensation system of substantial size would be needed to cool the gases from their reactor exit temperatures, in the neighborhood of 400° C. or more, to the condensation temperatures of the materials which it is desired to remove from the gas stream. The liquid body, conveniently substantially carbon tetrachloride, will be at a temperature of between about 75° C. and 150° C. and generally within the temperature range 100° C. and 125° C. as was the case in the run set out above. The gas stream, saturated with the quenching fluid, is then fed from the liquid body to a condensation system.

The temperature to which the reaction products are cooled to effect condensation is significant in that uncondensed chlorinated hydrocarbons that pass to the following reactor will undergo further chlorination to yield a higher percentage of the higher molecular weight components. Condensation temperatures can therefore be used as a control over product distribution with maximum recovery of low molecular weight materials occurring at minimum temperature. For example, if it is desired to maximize methylene chloride production, the intermediate condensation system would be operated in the vicinity of —20° C. to —30° C. If it is desired to maximize chloroform production, the intermediate condensation is operated within the range 10° C. to 20° C. The latter temperature substantially removes carbon tetrachloride and chloroform without removing appreciable quantities of methylene chloride or methyl chloride, and the suggested —20° C. to —30° C. removes substantially all of the methylene chloride as well. Where it is desired to remove methyl chloride also as a product, a temperature substantially less than the dew point of methyl chloride is selected, such as, for example, —40° C. to —50° C., temperatures which are entirely practical of commercial achievement. If substantially all products excepting carbon tetrachloride are to be passed to the second reactor, an intermediate condensation temperature as high as 50° C. may be used. As noted above, the gas stream is then fed to the second reactor and subsequently to a second quench tank followed by a second condensation zone. Where the second condensation operates at a temperature no higher than 0° C. and preferably about —25° C., chloroform, carbon tetrachloride, and methylene chloride are condensed out and the majority of the methyl chloride remains in the gaseous stream. The gaseous stream exiting the last condensation system must be treated in an absorption tower and by other means to remove the HCl by-product. Various means for removing HCl have been utilized in connection with single reactor processes, and hence this step need not be described in detail herein. It is also possible to separate the chlorinated hydrocarbons and the HCl from the gas stream exiting the single reactors in a single step through the use of an aqueous HCl quench system operating at a temperature of no greater than 50° C. Such systems are known for use in C₁-C₄ hydrocarbon perchlorination reaction systems and may be the preferred method for separating HCl and chlorinated hydrocarbons, in certain circumstances.

It will be noted that all of the suggested temperatures are somewhat lower than the atmospheric boiling points of the materials involved, but obviously the system operates under a high inert loading which reduces the dew point of the mixture. A certain amount of pressure is necessary whereby to assure the proper throughput and a high operating pressure is conducive to increased recovery of condensible materials at a specified condensation temperature; however, this variable is generally determined by other process or design requirements and condensation facilities are designed accordingly. Generally, however, the system is operated under 5 to 30 pounds p.s.i. gauge. Operating pressures of this magnitude have very little effect on the partial methane chlorination reaction providing all other variables are maintained constant. Higher operating pressures are advantageous, however, from the standpoint of gas handling facilities, equipment size, pressure drops, and condensation surface. The upper limit of operating pressure is generally determined by design and equipment limitations and process economics.

The data for the examples presented in Tables I and II were accumulated under conditions in which methyl chloride was maintained in captive equilibrium. Methyl chloride captivity is not a requirement of either single or multiple series reactor operation and can readily be removed as a finished product along with the other components. In those instances where methyl chloride is not desired as a final product, complete captivity can be achieved through suitable recycling facilities to the reaction system. In the multiple series reactor system, methyl chloride can be recycled to the first reactor in the system or can be proportioned between the various reactors. Since a specific ratio of chlorine to methyl chloride would produce a product distribution more favorable to the higher molecular weight components than would the same ratio of chlorine to methane, the net effect of recycling or substituting methyl chloride for a portion of the methane would be an increase in the percentage of the heavier components which appear as final products.

The table below relates the conditions necessary to achieve a product mol distribution of 3.0 (methylene chloride to chloroform) in a process variant wherein no methyl chloride is recycled and compares results of a single reactor and the two series reactor system with intermediate condensation. Because of the —25° C. intermediate condensation temperature in the two series reactor process, much of the methyl chloride generated in the first reactor escaped the intermediate condensation and passed into the second reactor, thus reducing somewhat the overall percentage of methyl chloride obtained in the final product. The improvements in conversion efficiency, based on the total $CH_4$ in the feed, and in the "recycle ratio" requirements where the process of this invention is practiced, are evident. As in the case of all the runs reported previously, the residence time of the gases in the single reactor system was 15 seconds and where the two series reactor system was used, the residence time in the first reactor was 5 seconds and in the second, 15 seconds.

Table III

|  | Single Reactor | Two series Reactors |
|---|---|---|
| Chlorine ratio | 0.350 | 0.575 |
| Reaction temperature (° C.) | 475 | 475 |
| Reaction pressure (p.s.i.g.) | 15 | 15 |
| Reaction products cooled to (° C.) | —25 | —25 |
| Liquid diluent in mols/mol $Cl_2$ | 0.210 | 0.093 |
| $CH_3Cl$ produced (gm.-mol) | 5.90 | 4.70 |
| $CH_2Cl_2$ produced (gm.-mol) | 3.00 | 3.00 |
| $CHCl_3$ produced (gm.-mol) | 1.00 | 1.00 |
| $CCl_4$ produced (gm.-mol) | 0.10 | 0.20 |
| Recycle ratio | 3.37 | 2.00 |
| Conversion of $CH_4$ (percent) | 22.9 | 35.4 |

Table IV below compares the results obtainable with the single reactor versus the two series reactor with intermediate condensation system where the quantity of methane recycled is held constant with the methylene chloride to chloroform distribution (the product ratio) being maintained at 3.0 in each case. No methyl chloride was recycled in either instance. The increases in quantities of the methylene chloride and chloroform obtained where the two series reactor system with intermediate condensation is used are self-evident from the table. Also, where the two series reactor system is used, the chlorine ratio may be increased substantially without detrimentally affecting the yields of the lighter ends.

Table IV

|  | Single Reactor | Two Series Reactors |
|---|---|---|
| Product ratio | 3.0 | 3.0 |
| Chlorine ratio | 0.350 | 0.575 |
| Recycle (gm.-mol) | 17.7 | 17.7 |
| $CH_3Cl$ produced (gm.-mol) | 3.11 | 4.67 |
| $CH_2Cl_2$ produced (gm.-mol) | 1.58 | 3.00 |
| $CHCl_3$ produced (gm.-mol) | 0.53 | 1.00 |
| $CCl_4$ produced (gm.-mol) | 0.05 | 0.20 |

Table V compares the results where methylene chloride is recycled on the one hand and little, if any, methylene chloride is recycled on the other. Results for both the single reactor system and the two series reactor with intermediate condensation system are set forth. Methyl chloride was maintained in captive equilibrium in each case. As seen from the data, methylene chloride can be recycled when using the process of this invention to yield a much higher concentration of chloroform without causing a significant increase in carbon tetrachloride formation. It is to be noted that the liquid diluent requirements for the two series system remain far below those where the single reactor system is used, and, as pointed out earlier, one of the chief advantages of this invention lies in the fact that where it is desired to maximize the yield of the heavier reaction products, extremely low diluent requirements, by conventional standards, are encountered.

Table V

|  | Single Reactor | | Two Series Reactors | |
|---|---|---|---|---|
|  | No $CH_2Cl_2$ Recycle | $CH_2Cl_2$ Recycle | No $CH_2Cl_2$ Recycle | $CH_2Cl_2$ Recycle |
|  | Example 1 | Example 2 | Example 3 | Example 4 |
| Chlorine ratio | 0.710 | 0.710 | 0.850 | 0.850 |
| Chlorine consumed (gm. mols) | 5.72 | 5.72 | 5.72 | 5.72 |
| Methylene ratio [a] |  | 0.20 |  | 0.20 |
| Reactor temperature (° C.) | 475 | 475 | 475 | 475 |
| Liquid $CCl_4$ diluent in mols/mol $Cl_2$ | 0.55 | 0.26 | 0.290 |  |
| Intermediate reaction products cooled to (° C.) |  |  | 0 | 0 |
| Final reaction products cooled to (° C.) | —25 | —25 | —25 | —25 |
| $CH_2Cl_2$ produced (gm.-mols) | 1.02 | 0.76 | 1.00 | 0.74 |
| $CHCl_3$ produced (gm.-mols) | 1.02 | 1.13 | 1.00 | 1.11 |
| $CCl_4$ produced (gm.-mols) | 0.16 | 0.20 | 0.18 | 0.23 |
| Recycle ratio | 2.68 | 2.87 | 2.09 | 2.23 |
| Conversion of $CH_4$ (percent) | 27.2 | 25.8 | 32.3 | 31.0 |

[a] Gm.-mol ratio of recycle methylene chloride to chlorine consumed methylene chloride being introduced as a liquid together with the liquid diluent.

A considerable temperature range exists in which the partial methane chlorination reaction can be accomplished. In large industrial reactors, temperature is usually controlled within the 350° C. to 550° C. range, with the lower limit determined by reactor stability which itself depends upon reactor design, mixing of reactants and reactant concentrations. The upper limit of operating temperature is established by the carbonization or decomposition reaction which becomes rather significant at 550° C. to 600° C. A preferred temperature range is 400° C. to 500° C.

Temperature has virtually no effect upon product distribution in the 400° C.–500° C. range providing the ratio of reactants is maintained constant as temperature is varied. If the ratio of reactants is varied in order to vary temperature, a change in product distribution will occur. However, this is due to the change in chlorine ratio rather than temperature.

Chloroform has been found to be the component most susceptible to decomposition at elevated temperature, and it therefore is desirable to maintain lower operating temperatures when conditions favor a higher percentage of this component.

The distribution of products resulting from the partial methane chlorination reaction is primarily a function of the chlorine ratio in the feed to the reaction system. However, at low chlorine ratios, reactor retention, space velocity, and back mixing of reactants become significant factors in determining product distribution and particularly from the standpoint of methyl chloride formation. It has been shown that a higher percentage of methyl chloride will be produced as a result of low retention, high space velocity, and minimum back mixing of reactants. A high retention reactor with lower space velocity and greater back mixing will yield less methyl chloride and more of the higher molecular weight components at the same chlorine ratio. Generally, where the multiple reactor system is employed, the gaseous stream will remain within each of the reactors for a period of between 3 and 30 seconds and preferably between 5 and 15 seconds.

The partial methane chlorination reaction is exothermic and generates between 22,000 and 25,000 calories per gm.-mol of chlorine reacted depending upon temperature and the specific stepwise chlorination. In order to maintain a specified temperature, a relationship exists between chlorine consumption and total methane demand or chlorine ratio, providing only chlorine and methane are fed to the reaction system and auxiliary heat control facilities are not employed. Thus, selecting a specific operating temperature will effectively establish chlorine ratio with virtually no flexibility in product distribution for a given reaction system and a specified throughput.

Various techniques have been employed for overcoming the above limitation in commercial installations. These include regulation of feed temperature, external heat control facilities, and the use of an inert of diluent vaporous media such as hydrogen chloride, carbon tetrachloride, or other materials which can be introduced along with the feed to permit higher chlorine ratios and a product distribution more favorable to the higher molecular weight components. In the preferred embodiment of this invention, a liquid or vaporous diluent, preferably liquid substantially carbon tetrachloride, is introduced along with the feed. The diluent is preferably introduced into the reaction vessel in the form of a fine spray. This is best achieved in a commercial plant by the use of an atomizer such as that described in our copending application Serial No. 58,368, filed even date herewith.

The multiple reactor system makes possible the reduction of diluent requirements to far more convenient and manageable levels. It may be shown that the single reactor system consumes approximately twice as much equivalent diluent as the series reactor involving intermediate condensation, where the same product distribution involving an equilibrium shifted in the direction of the heavier materials is sought. See Examples 3 and 6 in Table I. The great difference in diluent requirements is due to the fact that the intermediate condensation zone serves to remove a substantial amount of the heat contained in the gases at a point between the reactors. Thus, the need for handling a great quantity of diluent and the problems presented thereby are substantially reduced.

Another advantage of this invention flows from substitution of liquid for vaporous diluent, with the proper dispersion being achieved in the manner described above. The atomization method suggested earlier makes possible the use of a liquid with substantial improvements in results. For example, the single reactor using vapor carbon tetrachloride diluent (Example 3 in Table I) requires 1.72 mols of diluent per mol of chlorine reactant, whereas the two series reactor system producing the same product distribution (Example 6 in Table I) but using liquid diluent requires only 0.31 mol per mol of chlorine. In this instance, the single reactor system requires over 5 times as much diluent. This improvement becomes particularly noticeable when the higher chlorine ratios are used, i.e., in the range of .75–1.25, whereby to maximize production of chloroform.

An advantage of this invention lies in the ability to achieve a product distribution favorable to the higher molecular weight components without resorting to elaborate auxiliary heat control facilities. Flexibility in this direction is readily achieved by reducng the amount of condensation accomplished between reaction systems. Low molecular weight components escape the condensation equipment and pass to the following reaction system where further chlorination to the higher molecular weight components occurs in the presence of a relatively higher concentration of chlorine. Thus, the overall product distribution would be more favorable to the higher molecular weight components than would a corresponding single reactor system consuming an equivalent amount of chlorine and without auxiliary means of temperature control.

The chlorine ratios specified represent the total chlorine consumed in all reactors and may range between about 0.40 and 1.25 for the two series reactor system described herein. This chlorine is distributed between the two reactors and fed individually thereto, the percentage of the total chlorine fed to either reactor falling within the range ⅓–⅔ of the total. Preferably, the chlorine is fed in about equal quantities to the two reactors. Because of this distribution of chlorine, the chlorine ratios for the individual reactors are much lower than the overall ratio (given in the tables supra) since the total chlorine is distributed between the two reactors so as to maintain similar chlorine ratios in each, additional chlorine being introduced in the second reactor at the point indicated in FIGURE 1.

The reactors used in all of the tests reported herein were in the form of elongated tubes having external heating means for start-up purposes. As is apparent, additional reaction zones may be provided and are within the scope of this invention, as are alternative types of heating means for initiating and stabilizing the reaction. However, condensation between at least one linked pair of reaction zones is required if the advantages of this invention are to be obtained.

At the lower chlorine ratios, the multiple series reactor concept incorporating intermediate condensation offers distinct advantages with respect to the recycle ratios which must be observed, as lesser quantities of methane need be recycled with the apparatus set-up suggested. At the higher chlorine ratios, the diluent requirements are decreased substantially over those which must be used where the single reactor is utilized. Generally, this invention will be practiced in such a manner as to maximize the yield of methylene chloride and chloroform and, when so practiced, it is preferred to operate at chlorine ratios less than 1.0.

Obviously, many modifications and variations of this invention may be made without departing from the spirit and scope thereof, and therefore only such limitations should be imposed as are indicated in the appended claims.

We claim:
1. A process for the partial chlorination of methane comprising: feeding gaseous chlorine, methane and carbon tetrachloride diluent to a first reaction zone maintained at a temperature between about 350° C. and 550° C. whereby to form a gaseous product stream containing unreacted methane, hydrogen chloride, carbon tetrachloride and partially chlorinated hydrocarbons including chloroform and methylene chloride; cooling said product stream to a temperature no greater than about −25° C. whereby to condense carbon tetrachloride, chloroform and methylene chloride out of said product stream; passing the remaining gaseous material including substantially all of said hydrogen chloride so produced to a second reaction zone maintained at a temperature between about 350° C. and 550° C. and admixing additional chlorine and carbon tetrachloride diluent therewith whereby to form a gaseous product stream containing unreacted methane, hydrogen chloride, carbon tetrachloride and partially chlorinated hydrocarbons including chloroform and methylene chloride; cooling said gaseous product stream to a temperature no greater than about −25° C. whereby to condense carbon tetrachloride, chloroform and methylene chloride from said product stream; removing the hydrogen chloride from the remaining portions of said product stream; drying and recycling through at least one of said reaction zones the remaining gaseous materials; and admixing additional diluent and chlorine with the said gaseous materials being recycled through the said last-mentioned reaction zone.

2. The process of claim 1 wherein the said diluent is vaporous carbon tetrachloride.

3. The process of claim 1 wherein the said diluent is liquid carbon tetrachloride.

4. The process of claim 1 wherein each reaction zone is maintained at a temperature of between about 400° C. and 500° C.

5. The process of claim 1 wherein each reaction zone is maintained at a temperature of between about 400° C. and 500° C. and wherein the residence times of the said gaseous streams in each of the said reaction zones are each between 3 and 30 seconds.

6. A process for the partial chlorination of methane comprising: feeding gaseous chlorine, methane and liquid carbon tetrachloride diluent to a first reaction zone maintained at a temperature between about 350° C. and 550° C. whereby to form a gaseous product stream containing unreacted methane, hydrogen chloride, carbon tetrachloride, chloroform, methylene chloride and methyl chloride; cooling said product stream to a temperature no greater than about −50° C. whereby to condense carbon tetrachloride, chloroform, methylene chloride and methyl chloride out of said product stream; passing the remaining gaseous materials including substantially all of said hydrogen chloride so produced to a second reaction zone maintained at a temperature between about 350° C. and 550° C. and admixing therewith additional chlorine and liquid carbon tetrachloride diluent whereby to form a gaseous product stream containing unreacted methane, hydrogen chloride, methyl chloride, methylene chloride, chloroform and carbon tetrachloride; cooling said gaseous product stream to a temperature no greater than about −50° C. whereby to condense carbon tetrachloride, chloroform, methylene chloride and methyl chloride from said product streams; removing the hydrogen chloride from the remaining portions of said product stream; drying the residual gas and recycling through at least one of said reaction zones the gaseous materials remaining after said carbon tetrachloride, methylene chloride, chloroform, methylene chloride and methyl chloride have been removed therefrom and admixing additional diluent and chlorine with said gaseous materials being recycled to the last-mentioned reaction zone.

References Cited in the file of this patent
UNITED STATES PATENTS

| | | |
|---|---|---|
| 1,975,727 | Levine | Oct. 2, 1934 |
| 2,793,435 | Lukes et al. | May 14, 1957 |
| 2,829,180 | Montgomery et al. | Apr. 1, 1958 |
| 2,839,589 | Brown | June 17, 1958 |
| 2,857,438 | Obrecht et al. | Oct. 21, 1958 |
| 2,989,571 | Eisenlohr | June 20, 1961 |